(12) United States Patent
Maehara et al.

(10) Patent No.: US 12,227,443 B2
(45) Date of Patent: Feb. 18, 2025

(54) HEATER, MANUFACTURING APPARATUS FOR MANUFACTURING GLASS ARTICLE, AND MANUFACTURING METHOD FOR MANUFACTURING GLASS ARTICLE

(71) Applicant: AGC Inc., Tokyo (JP)

(72) Inventors: Terutaka Maehara, Tokyo (JP); Akifumi Niwa, Tokyo (JP); Shuntaro Hyodo, Tokyo (JP); Takashi Enomoto, Tokyo (JP); Takeshi Yamazaki, Tokyo (JP); Yoji Doi, Tokyo (JP); Roger Pauli, Stourbridge (GB); Lawrence Keen, Stourbridge (GB)

(73) Assignee: AGC Inc., Tokyo (JP)

( * ) Notice: Subject to any disclaimer, the term of this patent is extended or adjusted under 35 U.S.C. 154(b) by 999 days.

(21) Appl. No.: 17/098,983

(22) Filed: Nov. 16, 2020

(65) Prior Publication Data

US 2021/0078892 A1  Mar. 18, 2021

Related U.S. Application Data

(63) Continuation of application No. PCT/JP2019/023748, filed on Jun. 14, 2019.

(30) Foreign Application Priority Data

Jun. 22, 2018 (JP) ................. 2018-118616

(51) Int. Cl.
*C03B 5/235* (2006.01)
*C03B 5/04* (2006.01)
(Continued)

(52) U.S. Cl.
CPC .............. *C03B 5/2356* (2013.01); *C03B 5/04* (2013.01); *C03B 18/02* (2013.01); *C03B 25/08* (2013.01);
(Continued)

(58) Field of Classification Search
CPC .......... H05B 3/64; H05B 3/0033; H05B 3/06; H05B 3/44; H05B 2203/025; H05B 3/10;
(Continued)

(56) References Cited

U.S. PATENT DOCUMENTS 3,151,201 A * 9/1964 Kilian ...................... H05B 3/78
373/41
3,912,477 A 10/1975 Brady et al.
(Continued)

FOREIGN PATENT DOCUMENTS

CN 203675347 U 6/2014
EP 1220569 A2 * 7/2002 ............. C30B 25/10
(Continued)

OTHER PUBLICATIONS

JPS377189 (Denki) 1957-12 (online machine translation), [Retrieved on Aug. 9, 2023]. Retrieved from: Docket (Year: 1957).*
(Continued)

*Primary Examiner* — Dana Ross
*Assistant Examiner* — Kuangyue Chen
(74) *Attorney, Agent, or Firm* — Oblon, McClelland, Maier & Neustadt, L.L.P.

(57) ABSTRACT

According to the present invention, provided is a heater including a heat generating member being conductive and configured to radiate heat rays by being fed with electric power, a tubular member constituted by a metal and accommodating the heat generating member, and an intermediate member arranged between the heat generating member and the tubular member and constituted by an electrically insulating material, wherein the intermediate member is arranged and/or configured to allow, among the heat rays radiated from the heat generating member, at least light having a wavelength of from 1 μm to 2 μm to pass through the intermediate member to reach the tubular member.

28 Claims, 7 Drawing Sheets

(51) Int. Cl.
  *C03B 18/02* (2006.01)
  *C03B 25/08* (2006.01)
  *F27D 11/02* (2006.01)
  *H05B 3/06* (2006.01)
  *H05B 3/44* (2006.01)
  *H05B 3/64* (2006.01)
  *H05B 3/10* (2006.01)
(52) U.S. Cl.
  CPC ............... *F27D 11/02* (2013.01); *H05B 3/06*
    (2013.01); *H05B 3/44* (2013.01); *H05B 3/64*
    (2013.01); *H05B 3/10* (2013.01); *H05B*
    *2203/025* (2013.01)
(58) Field of Classification Search
  CPC ........... C03B 5/04; C03B 25/08; C03B 18/02;
    C03B 5/2356; C03B 5/033; C03B 7/07;
    F27D 11/02
  See application file for complete search history.

(56) References Cited

U.S. PATENT DOCUMENTS

| | | | |
|---|---|---|---|
| 4,319,127 A | | 3/1982 | Lindstrom et al. |
| 5,951,896 A | | 9/1999 | Mahawili |
| 7,576,306 B2 | | 8/2009 | Lewin |
| 2007/0138141 A1* | | 6/2007 | Cites .................... B24B 37/013 |
| | | | 438/692 |
| 2007/0178022 A1* | | 8/2007 | Bauman ................. B01J 12/007 |
| | | | 422/130 |
| 2008/0006620 A1 | | 1/2008 | Lee et al. |
| 2014/0209375 A1* | | 7/2014 | Linow ................. H01B 13/0036 |
| | | | 174/128.1 |
| 2015/0253698 A1 | | 9/2015 | Higashiyama |
| 2021/0078892 A1 | | 3/2021 | Maehara et al. |

FOREIGN PATENT DOCUMENTS

| | | |
|---|---|---|
| FR | 2 418 432 A1 | 9/1979 |
| JP | 28-3686 | 4/1953 |
| JP | S283686 Y1 * | 4/1953 |
| JP | 37-7189 | 4/1962 |
| JP | S377189 * | 4/1962 |
| JP | 59-19893 B2 | 5/1984 |
| JP | 2001-124477 A | 5/2001 |
| JP | 2007-529087 A | 10/2007 |
| JP | 2015-169802 A | 9/2015 |
| JP | 6744001 B2 | 8/2020 |
| JP | 6760534 B1 | 9/2020 |

OTHER PUBLICATIONS

Extended European Search Report issued Feb. 17, 2022 in European Patent Application No. 19822573.2, 10 pages.

* cited by examiner

HEATER, MANUFACTURING APPARATUS FOR MANUFACTURING GLASS ARTICLE, AND MANUFACTURING METHOD FOR MANUFACTURING GLASS ARTICLE

CROSS-REFERENCE TO RELATED APPLICATION

The present application is a continuation application filed under 35 U.S.C. 111 (a) claiming benefit under 35 U.S.C. 120 and 365 (c) of PCT International Application No. PCT/JP2019/023748 filed on Jun. 14, 2019 and designating the U.S., which claims priority to Japanese Patent Application No. 2018-118616 filed on Jun. 22, 2018. The entire contents of the foregoing applications are incorporated herein by reference.

BACKGROUND OF THE INVENTION

1. Field of the Invention

The present invention relates to a heater, a manufacturing apparatus for manufacturing a glass product, and a manufacturing method for manufacturing a glass product.

2. Description of the Related Art

Conventionally, a heater has been used as a heat source in a melting furnace for melting a metal such as aluminum.

For example, PTL 1 describes a heater constructed by introducing a coiled heating body and an insulating powder material into a ceramic protection tube. PTL 2 describes a heater constructed by introducing a coiled resistor and a heat-resistant material into a metal sheath. PTL 3 describes an electric device that supplies heat to molten glass by energizing a platinum annular tube.

CITATION LIST

Patent Literature

[PTL 1] Japanese Unexamined Patent Publication No. 2001-124477
[PTL 2] U.S. Pat. No. 4,319,127
[PTL 3] Japanese Examined Patent Publication No. S59-19893
[PTL 4] Japanese Translation of PCT Publication No. 2007-529087

SUMMARY OF THE INVENTION

Technical Problem

However, conventional heaters described in PTLs 1 and are designed to be used mainly by being immersed in molten metal such as aluminum, and it is difficult to use such heaters upon heating the heaters to a high temperature of 1200 degrees Celsius or more. PTL 4 discloses a heater in which a rod-shaped heating element supported by a supporting ceramic disk is contained within a ceramic pipe. However, this heater is also difficult to be heated to a high temperature of 1200 degrees Celsius or more. PTL 3 describes a heater expected to be used by being immersed in molten glass. However, it is necessary to apply a large current to the heater, and as a result, there arises a problem in that a large-scale power supply device is required. It is stated that a typical voltage and a typical current are 5 V to 6 V and 5000 A, respectively. Therefore, there still is a need for a heater capable of heating to a higher temperature without the need for a large power supply device such as a power supply device that passes a large current of 1000 A or more.

The present invention has been made in view of such circumstances, and it is an object of the present invention to provide a heater capable of heating to 1200 degrees Celsius or more without the need for a large power supply device. In addition, it is an object of the present invention to provide a manufacturing apparatus having such a heater for manufacturing a glass product and a manufacturing method using such a heater for manufacturing a glass product.

Solution to Problem

According to the present invention, provided is a heater including:
  a heat generating member being conductive and configured to radiate heat rays by being fed with electric power;
  a tubular member constituted by a metal and accommodating the heat generating member; and
  an intermediate member arranged between the heat generating member and the tubular member and constituted by an electrically insulating material,
  wherein the intermediate member is arranged and/or configured to allow, among the heat rays radiated from the heat generating member, at least light having a wavelength of from 1 µm to 2 µm to pass through the intermediate member to reach the tubular member.

According to the present invention, provided is a manufacturing apparatus for manufacturing a glass product, including:
  a melting unit configured to melt a glass material to form molten glass; and
  a forming unit configured to make formed glass from the molten glass,
  wherein a heater is provided in any given unit disposed between the melting unit and the forming unit, the any given unit not including the forming unit,
  wherein the heater includes:
    a heat generating member being conductive and configured to radiate heat rays by being fed with electric power;
    a tubular member constituted by a metal and accommodating the heat generating member; and
    an intermediate member provided between the heat generating member and the tubular member and constituted by an electrically insulating material, and
  wherein the intermediate member is arranged and/or configured to allow, among the heat rays radiated from the heat generating member, at least light having a wavelength of from 1 µm to 2 µm to pass through the intermediate member to reach the tubular member.

Further, according to the present invention, provided is a manufacturing method for manufacturing a glass product, including:
  a melting step for melting a glass material to form a molten glass; and
  a forming step for forming the molten glass to make a glass product,
  wherein the molten glass comes into contact with a heater in any given step between the melting step and the forming step, the any given step not including the forming step, the heater including:
- a heat generating member being conductive and configured to radiate heat rays by being fed with electric power;
- a tubular member constituted by a metal and accommodating the heat generating member; and
- an intermediate member provided between the heat generating member and the tubular member and constituted by an electrically insulating material, and wherein the intermediate member is arranged and/or configured to allow, among the heat rays radiated from the heat generating member, at least light having a wavelength of from 1 μm to 2 μm to pass through the intermediate member to reach the tubular member.

Effect of Invention

According to the present invention, a heater capable of heating to 1200 degrees Celsius or more without the need for a large power supply device can be provided. In addition, according to the present invention, a manufacturing apparatus having such a heater for manufacturing a glass product and a manufacturing method using such a heater for manufacturing a glass product can be provided.

DETAILED DESCRIPTION OF THE PREFERRED EMBODIMENTS

Figure 1:
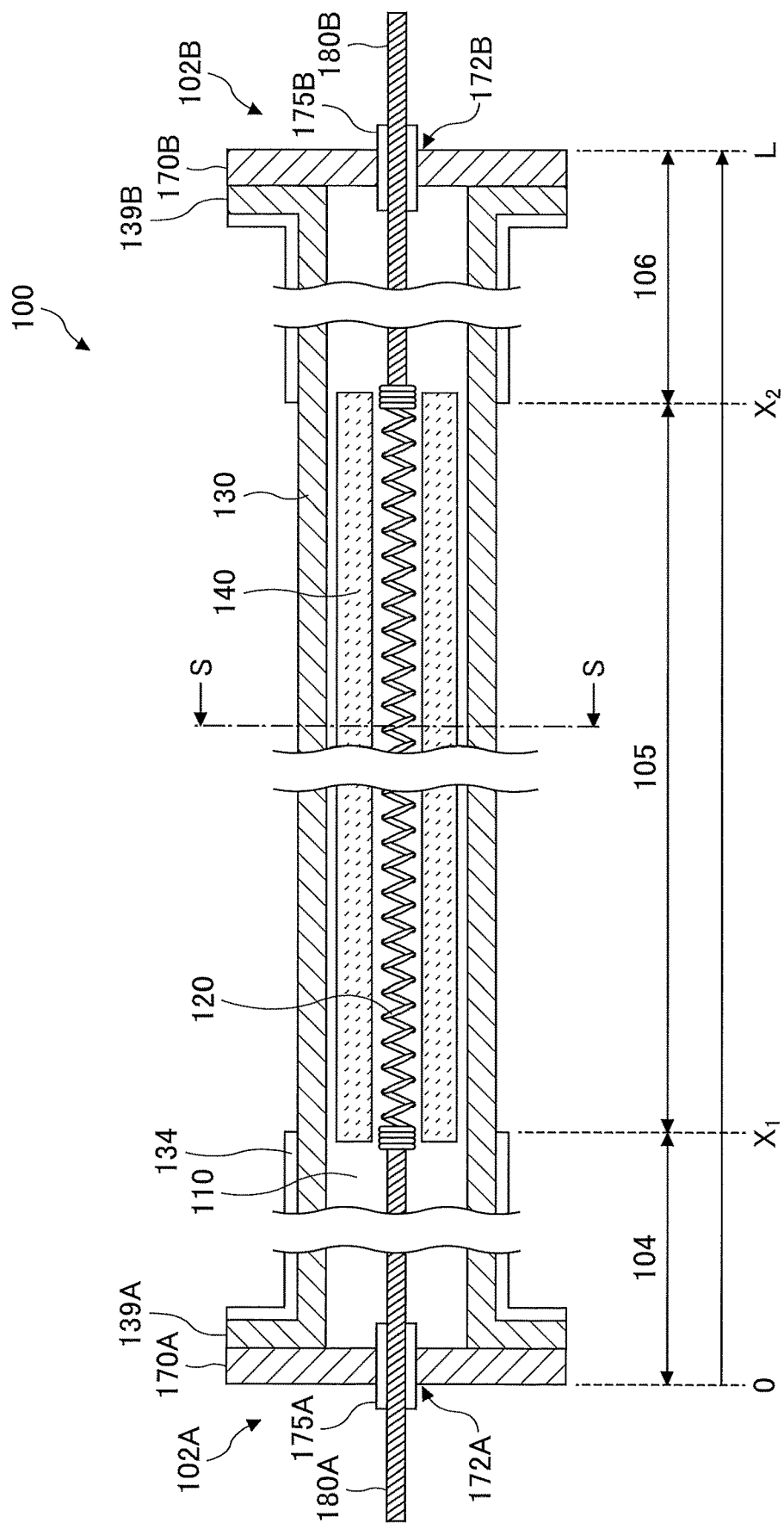
FIG. 1 is a drawing schematically illustrating an example of a cross section taken along a central axis of a heater according to an embodiment of the present invention.

Hereinafter, an embodiment of the present invention is explained.

According to the embodiment of the present invention, provided is a heater including:
- a heat generating member being conductive and configured to radiate heat rays by being fed with electric power;
- a tubular member constituted by a metal and accommodating the heat generating member; and
- an intermediate member arranged between the heat generating member and the tubular member and constituted by an electrically insulating material, wherein the intermediate member is arranged and/or configured to allow, among the heat rays radiated from the heat generating member, at least light having a wavelength of from 1 μm to 2 μm to pass through the intermediate member to reach the tubular member.

As explained above, there is a problem in conventional heaters when the conventional heaters are used at a high temperature of 1200 degrees Celsius or more.

The inventors of the present application have earnestly conducted research of heaters in order to address such problems. As a result, the inventors of the present application have discovered that a tubular member (outer tube), which is in contact with the outside (heating target), can be heated to a higher temperature by a radiation heat transfer from the heat generating member than by a conventional method for conducting heat from the heat generating member.

In a case where a tubular member is heated by a radiation method, it is considered effective not to allow any substance other than gas to exist between the heat generating member and the tubular member. However, in that case, there may be a problem in that the heat generating member is deformed when the heater is used at a high temperature (i.e., when the temperature of the constituent member increases to a high temperature), and the heat generating member and the tubular member come into contact with each other. When such contact occurs in a case where the tubular member is constituted by metal, the supplied current flows toward the tubular member having a lower resistance, and the temperature of the heat generating member does not rise.

In order to deal with this problem, it may be considered to provide an insulating material between the heat generating member and the tubular member. However, when an insulating material is provided between the heat generating member and the tubular member, the heat rays from the heat generating member are blocked by the insulating material, which makes it difficult to heat the tubular member by the radiation method.

In contrast, in the heater according to the embodiment of the present invention, an intermediate member is provided between the heat generating member and the tubular member. This intermediate member is arranged and/or configured to allow the emission of the heat rays from the heat generating member to the tubular member.

In order to achieve this, for example, as an intermediate member, a plurality of ring-shaped members may be arranged at intervals on the outer peripheral side of the heat generating member. Alternatively, a single ring-shaped member may be arranged so as to cover only a part of the outer circumference of the heat generating member.

In addition to this, or separately from this, the intermediate member may be constituted by a material having transparency with respect to the heat rays radiated from the heat generating member. For example, sapphire is known to have a high transmittance (80% or more at a thickness of 1 mm) with respect to light in a range of wavelength from 400 nm to 4000 nm. Aluminum oxynitride is also known to have a high transmittance (80% or more at a thickness of 2 mm) with respect to light in a range of wavelength from 400 nm to 4000 nm.

With the distinctive configuration as described above, in the heater according to the embodiment of the present invention, the heat rays radiated from the heat generating member can be effectively emitted to the tubular member. Further, even if the heater is heated to a high temperature, a contact between the heat generating member and the tubular member can be significantly prevented due to the presence of the intermediate member.

Therefore, in the heater according to the embodiment of the present invention, the tubular member can be heated relatively easily to a temperature of 1200 degrees Celsius or more. In addition, in the heater according to the embodiment of the present invention, a material and a shape with a high resistance value can be selected as the heat generating member. In addition, this makes it possible to use a high-voltage and low-current power supply device instead of a conventional low-voltage and high-current large-scale power supply device, and the size of the entire heating system that heats the heating target can be reduced.

In the embodiment of the present invention, the intermediate member is preferably arranged so as to pass, among the heat rays radiated from the heat generating member, at least light having a wavelength of from 1 μm to 2 μm, for example, light having a wavelength of from 1 μm to 4 μm, to pass through the intermediate member to reach the tubular member.

(Heater According to the Embodiment of the Present Invention)

An example of configuration of a heater according to an embodiment of the present invention is explained with reference to drawings.

FIG. 1 schematically illustrates an example of structure of a heater according to the embodiment of the present invention. FIG. 1 illustrates a cross section taken along a central axis of the heater 100 according to the embodiment of the present invention. However, with respect to the heat generation member 120, which is explained later, a side view is schematically shown, instead of a cross-sectional view, for the sake of clarity.

As illustrated in FIG. 1, the heater 100 according to the embodiment of the present invention (hereinafter referred to as a "first heater") has an approximate rod shape extending in a linear manner from a first heater end portion 102A to a second heater end portion 102B.

The first heater end portion 102A is closed by a first lid member 170A. The second heater end portion 102B is closed by a second lid member 170B. Therefore, in the first heater 100, an internal space 110 isolated from the outside is formed.

The internal space 110 is made into a non-oxidizing gas atmosphere in order to prevent the members contained in the internal space 110 from oxidizing. For example, the internal space 110 may be filled with an inert gas such as argon.

However, if a member (for example, a heat generating member described below) accommodated in the internal space 110 has a resistance against oxidation under the environment in which it is used, it is not always necessary to control the atmosphere in the internal space 110. In that case, the lid member 170A or 170B may not be provided.

The first heater 100 includes a heat generating member 120, a tubular member 130, and an intermediate member 140.

The heat generating member 120 and the intermediate member 140 are accommodated in the internal space 110. The tubular member 130, as well as the first lid member 170A and the second lid member 170B explained above, are members for dividing the internal space 110 of the first heater 100. The tubular member 130 protects the members accommodated in the internal space 110. The tubular member 130 is constituted by metal.

The heat generating member 120 functions as a heating body that generates heat when it is energized. The heat generating member 120 is constituted by a conductive material such as metal. One of the end portions of the heat generating member 120 is electrically connected to the first lead wire 180A. The other of the end portions of the heat generating member 120 is electrically connected to a second lead wire 180B.

The first lead wire 180A extends to the outside of the internal space 110 through a first opening 172A provided in the first lid member 170A. Likewise, the second lead wire 180B extends to the outside of the internal space 110 through a second opening 172B provided in the second lid member 170B. In order to prevent the first lead wire 180A from coming into contact with the first lid member 170A, a first insulating member 175A is attached to the first opening 172A of the first lid member 170A. Likewise, a second insulating member 175B is attached to the second opening 172B of the second lid member 170B.

For example, in particular cases, such as in a case where the first lead wire 180A and the heat generating member 120 are constituted by the same material, the boundary between the first lead wire 180A and the heat generating member 120 may be ambiguous. The same applies to the relationship between the second lead wire 180B and the heat generating member 120.

Therefore, in the present application, the first lead wire 180A or the second lead wire 180B is defined as a portion exposed to a temperature of 400 degrees Celsius or less at the maximum during normal use. This enables distinguishing the first lead wire 180A or the second lead wire 180B from the heat generating member 120.

In the example as illustrated in FIG. 1, the heat generating member 120 has an approximate coiled form in order to increase the amount of heat generated per unit area and increase the resistance value. However, this is merely an example, and the heat generating member 120 does not necessarily have to have a coiled form.

The intermediate member 140 is arranged between the tubular member 130 and the heat generating member 120. The intermediate member 140 is constituted by an electrically insulating material.

In the example as illustrated in FIG. 1, the intermediate member 140 has an approximate tube-shaped structure with both ends open. Therefore, the heat generating member 120 has been introduced into the inside of the intermediate member 140. The intermediate member 140 is constituted by a ceramic material having a transmittance of 50% or more with respect to at least light having a wavelength of from 1 μm to 2 μm.

The intermediate member 140 may be constituted by a ceramic material having a transmittance of 50% or more with respect to the light having the wavelength of from 1 μm to 2 μm, for example, light having a wavelength of from 1 μm to 4 μm.

Hereinafter, an operation of the first heater 100 having such a configuration is explained.

When the first heater 100 is used, the first heater 100 is installed in or in proximity to the heating target. Also, a power supply device (not illustrated) is used to supply a current to the first lead wire 180A and the second lead wire 180B.

With the supplied electric current, the heat generating member 120 connected to the first lead wire 180A and the second lead wire 180B is resistance-heated. Also, this causes heat rays to be radiated from the heat generating member 120. The heat rays have a wavelength in a range of visible light to infrared (for example 400 nm to 5 μm).

First, the heat rays radiated from the heat generating member 120 are emitted to the intermediate member 140.

In this case, as described above, the intermediate member 140 is constituted by a ceramic material having a transparency with respect to light having the wavelength of from 1 μm to 2 μm. Therefore, at least some of heat rays (i.e., heat rays having a wavelength of from 1 μm to 2 μm) can pass through the intermediate member 140.

Thereafter, the heat rays having passed through the intermediate member 140 are emitted onto the tubular member 130. Accordingly, the temperature of the tubular member 130 rises. Also, due to this rise in the temperature, the heating target in contact with the outer surface of the tubular member 130 is heated.

In this manner, the heating target can be heated by using the first heater 100.

Because the first heater 100 has the intermediate member 140, the first heater 100 can significantly prevent electrical contact between the heat generating member 120 and the tubular member 130 even when the temperature of the heat generating member 120 rises while the first heater 100 is used.

In addition, with the first heater 100, the tubular member 130 can be effectively irradiated with the heat rays generated from the heat generating member 120 by the radiation method. As a result, the heat collection efficiency of the tubular member 130 is increased, and the heating target can be heated to a relatively higher temperature. For example, in the first heater 100, the tubular member 130 can be stably heated to 1200 degrees Celsius or more, for example, to 1400 degrees Celsius or more or to 1500 degrees Celsius or more.

In addition, with the first heater 100, it is not necessary to use a large-scale device to energize the heat generating member 120, and the size of a system for heating the heating target can be reduced.

(Components of First Heater 100)

Hereinafter, the components included in the heater according to the embodiment of the present invention is explained in more details. In this case, for the sake of clarity, the components are explained with reference to the first heater 100, for example. Therefore, when the members are referred to, reference symbols illustrated in FIG. 1 are used.

(First Heater 100)

The shape of the first heater 100 is not particularly limited. The first heater 100 may have, for example, a substantially cylindrical or substantially prismatic form. The cross section of the first heater 100 perpendicular to the longitudinal direction (i.e., the direction of the central axis) may be a substantially circular shape, a substantially elliptical shape, a substantially triangular shape, a substantially quadrangular shape (including trapezoids), or any other polygonal shape.

In the following description, for example, it is assumed that the cross section of the first heater 100 is a substantially circular shape.

Also, for the sake of clarifying the explanation, as illustrated in FIG. 1, the first heater 100 is divided into three parts along the longitudinal direction, i.e., a first part 104, a second part 105, and a third part 106, for the sake of convenience.

Among them, where the end of the first heater end portion 102A of the first heater 100 is defined as a position at a distance 0 (zero), the first part 104 represents a zone between the position at the distance 0 and a position at a predetermined distance ($X_1$) away from the position at the distance 0 toward the second heater end portion 102B.

Also, the second part 105 represents a zone between the position at the distance $X_1$ and a position at a predetermined distance ($X_2$) away from the position at the distance 0 toward the second heater end portion 102B. Therefore, the length of the second part 105 is $X_2-X_1$.

The third part 106 represents a zone between the position at the distance $X_2$ and the second heater end portion 102B. Therefore, the length of the third part 106 is $L-X_2$. In this case, L denotes the entire length of the first heater 100 (specifically, the outer surface of the first lid member 170A to the outer surface of the second lid member 170B; see FIG. 1).

In this case, the second part 105 includes the part where the temperature rises most greatly while the first heater 100 is used. Normally, the first heater 100 reaches the highest temperature at an approximate center of the second part 105, i.e., a position at $L/2$ $(=X_1+(X_2-X_1)/2=X_1/2+X_2/2)$ with respect to the position at the distance 0.

In contrast, the first part 104 and the third part 106 include parts where the temperatures do not rise greatly while the first heater 100 is used. In other words, normally, while the first heater 100 is used, the temperature of the first part 104 becomes the highest at the position of $X_1$, and tends to gradually decrease toward the position at the distance 0. In the third part 106, the temperature tends to change in a similar manner.

In the first heater 100, the length ($X_1$) of the first part 104, the length ($X_2-X_1$) of the second part 105, and the length ($L-X_2$) of the third part 106 change according to the entire length L, the specification, and the like of the first heater 100.

In the present application, for the sake of convenience, a portion around the connection portion between the heat generating member 120 and the first lead wire 180A is defined as a boundary between the first part 104 and the second part 105, and a portion around the connection portion between the heat generating member 120 and the second lead wire 180B is defined as a boundary between the second part 105 and the third part 106. However, such definitions are merely examples, and it should be noted that a boundary between parts may be defined on the basis of other criteria. For example, both ends of the intermediate member 140 may be defined as the boundary between the first part 104 and the second part 105 and a boundary between the second part 105 and the third part 106, respectively.

(Each Member Constituting the First Heater 100)

Hereinafter, each member constituting the first heater 100 is explained in details.

Figure 2:
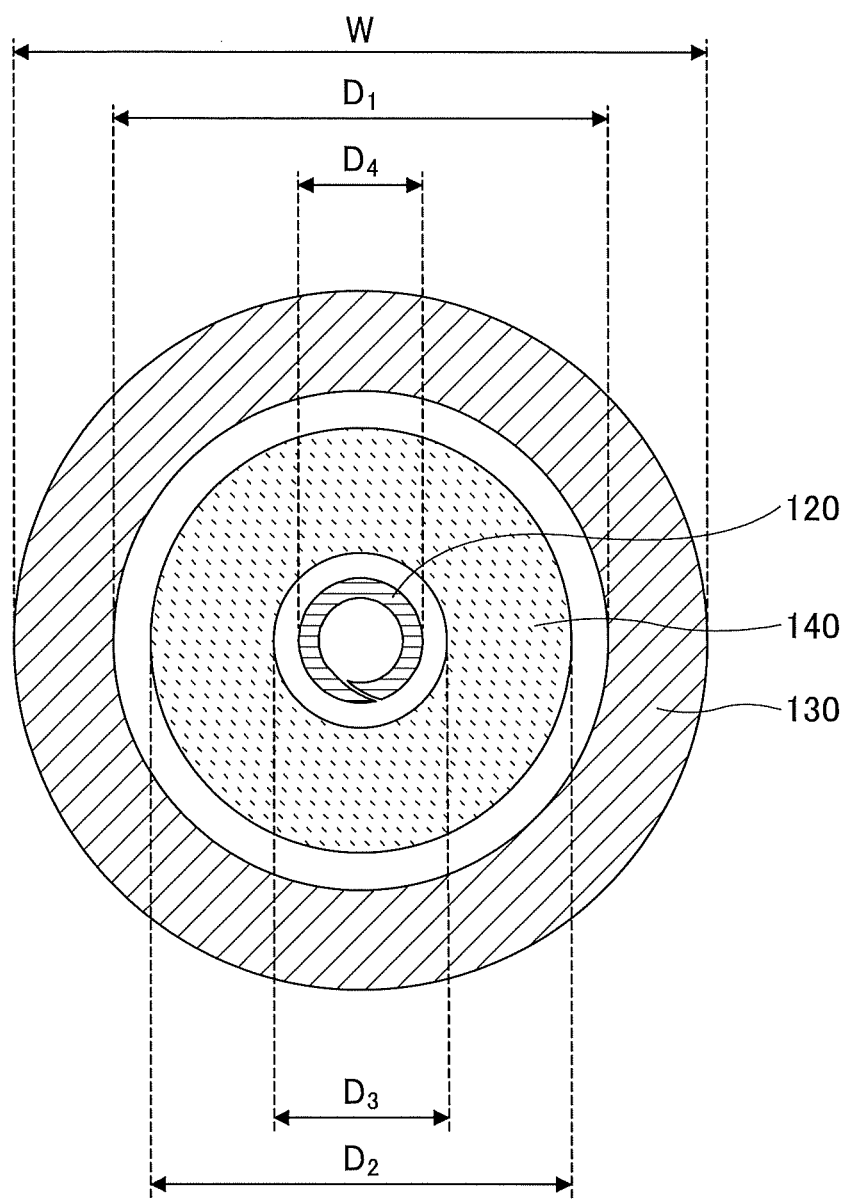
FIG. 2 is a drawing schematically illustrating a cross section taken along line S-S of the heater as illustrated in FIG. 1.

FIG. 2 schematically illustrates an example of a cross section taken along line S-S of the first heater 100 illustrated in FIG. 1. As described above, it is assumed that the cross section of the first heater 100 is a substantially circular shape.

In FIG. 2, W denotes a diameter of the first heater 100 (i.e., the outer diameter of the tubular member 130). $D_1$ denotes an inner diameter of the tubular member 130. $D_2$ denotes an outer diameter of the intermediate member 140. $D_3$ denotes an inner diameter of the intermediate member 140. $D_4$ denotes an outer diameter of the heat generating member 120 (coil).

Hereinafter, the symbols illustrated in FIG. 2 are used to indicate the dimensions of the respective members in the cross section.

(Internal Space 110, First Lid Member 170A, and Second Lid Member 170B)

The internal space 110 where various members are accommodated preferably has a low oxygen partial pressure.

For this reason, the internal space 110 may be filled with a non-oxidizing gas such as a reducing gas and/or an inert gas. Hydrogen can be used as the reducing gas. As the inert gas, one or more selected from argon, helium, neon, krypton, xenon, radon, and nitrogen can be used.

In addition to this, or separately from this, the internal space 110 may be adjusted to be substantially at the atmospheric pressure while the first heater 100 is used.

In order to achieve such a non-oxidizing environment and/or an atmospheric pressure environment during use, one or two ports in communication with the internal space 110 may be provided in at least one of the first lid member 170A and the second lid member 170B. Through these ports, the internal space 110 can be filled with gas and the gas can be exhausted from the internal space 110. Through these ports, the internal space 110 can be filled with gas and the gas can be discharged from the internal space 110.

The configurations of the first lid member 170A and the second lid member 170B are not particularly limited as long as the environment of the internal space 110 can be properly maintained. Therefore, the description about the first lid member 170A and the second lid member 170B is omitted here.

(Heat Generating Member 120, First Lead Wire 180A, and Second Lead Wire 180B)

The heat generating member 120 is constituted by a conductive material having heat-resistance. The heat generating member 120 may be constituted by a material containing at least one selected from, for example, molybdenum, tungsten, tantalum, niobium, iridium, platinum, and rhodium. Specifically, the heat generating member 120 may be constituted by a metal such as molybdenum, tungsten, tantalum, niobium, iridium, platinum, and rhodium or an alloy including at least one of such metals (hereinafter metals and alloys are collectively referred to as "metals"). In particular, the heat generating member 120 is preferably constituted by a metal that can withstand a high temperature of 1800 degrees Celsius. Alternatively, the heat generating member 120 may be made using a resistance heat generating member made of an intermetallic compound or a non-metal, such as molybdenum disilicide ($MoSi_2$), silicon carbide (SiC), lanthanum chromite ($LaCrO_3$), or carbon (C).

In this case, it should be noted that the heat generating member 120 does not necessarily have to be constituted by the same material and/or made to have the same shape over the entire length. In other words, the heat generating member 120 may have multiple materials and/or multiple shapes over the entire length.

For example, the heat generating member 120 may be configured to have a first material in a first segment, a second material in a second segment, . . . and an n-th material in an n-th segment. In this case, n denotes an integer of 2 or more. Also, the heat generating member 120 may be configured to have a first form in a first segment, a second form in a second segment, . . . and an n-th form in an n-th segment. In this case, n denotes an integer of 2 or more.

When the heat generating member 120 has multiple segments in this manner, temperature changes can be intentionally made over the entire length.

For example, in a case where the first segment is made of a material of which resistance is higher than a second segment, the temperature of the first segment can be set to a higher temperature than the second segment, even in a case where the heat generating member 120 is energized with the same current value. Likewise, in a case where the first segment is made into a form having a resistance value per unit length higher than the second segment, the temperature of the first segment can be set to a higher temperature than the second segment.

When the first heater 100 is used, the heat generating member 120 can attain a temperature of 1500 degrees Celsius or more or 1600 degrees Celsius or more.

The form of the heat generating member 120 is not particularly limited. The heat generating member 120 may be constituted by, for example, a coiled linear member as illustrated in FIG. 1. Alternatively, the heat generating member 120 may have a rod shape (i.e., a solid shape), a plate shape, a tubular shape (i.e., a hollow shape), or the like. Still alternatively, the heat generating member 120 may have a shape with a combination of two or more selected from a coiled part, a rod-shaped part, a plate-shaped part, and a tube-shaped part. Still yet alternatively, multiple heat generating members 120 may be provided. In this case, the radius of the circumscribed circle that can surround a bundle of the multiple heat generating members 120 is defined as the outer diameter $D_4$ of the heat generating members 120.

Figure 3:
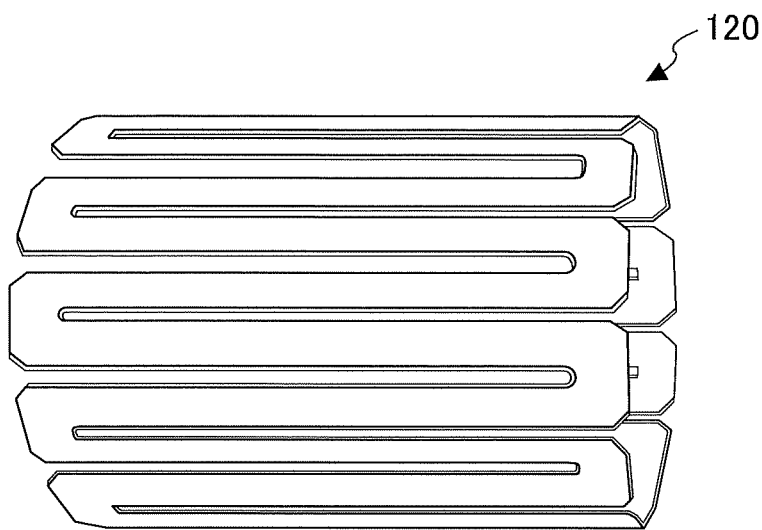
FIG. 3 is a drawing schematically illustrating another example of a form of a heat generating member used as a heater according to the embodiment of the present invention.

Also, the heat generating member 120 may have a form as illustrated in FIG. 3.

In the example as illustrated in FIG. 3, the heat generating member 120 has a configuration in which a conductor in a substantially cylindrical hollow shape is formed with multiple slits along the direction in which the axis of the first heater 100 extends (i.e., the right and left direction of FIG. 3). The slits are alternately formed from a first direction (for example, the left-hand direction in FIG. 3) and a second direction opposite from the first direction (for example, the right-hand direction in FIG. 3).

In a case where the heat generating member 120 is coiled, an insulating core member may be provided in the heat generating member 120. With the core member, the heat generating member 120 can be wound around the core member to form a proper coil shape. Furthermore, with the core member, the coil shape of the heat generating member 120 can be prevented from being deformed.

The core member is constituted by, for example, ceramics. Examples of such ceramics include oxides, nitrides, and borides of an "Al" element, an "Mg" element, a "Zr" element, a "Y" element, a "Ce" element, a "Be" element, and an "Si" element. Also, examples include a compound in which one or more selected from the oxides, the nitrides, and the borides are mixed. Specifically, examples include aluminum oxides, magnesium oxides, zirconium oxides, yttrium oxides, cerium oxides, beryllium oxides, zirconium silicates (zircons), silicon dioxides, mullites, boron nitrides, aluminum nitrides, and the like. Also, the core member may be constituted by the same material as the material constituting the intermediate member 140 explained later.

For example, the core member may be in a tubular or rod shape.

In the heat generating member 120, the electric resistance between the first lead wire 180A and the second lead wire 180B at the room temperature is preferably 0.01Ω or more, and more preferably 0.1Ω or more. The electric resistance between the first lead wire 180A and the second lead wire 180B in a temperature range of 1000 degrees Celsius or more is preferably 0.1Ω or more, more preferably 0.5Ω or more, still more preferably 1Ω or more, and yet still more preferably 1.5Ω or more.

In the example as illustrated in FIG. 1, both ends of the heat generating member 120 are bonded to the first lead wire 180A and the second lead wire 180B. However, this bonding is not always necessary, and the first lead wire 180A and the second lead wire 180B may be omitted. Both ends of the heat generating member 120 may extend directly to the outside of the first heater 100.

Moreover, in the first lead wire 180A and the second lead wire 180B, the temperature tends to be high at the joint with the heat generating member 120 and in the vicinity thereof. Therefore, instead of directly joining the first lead wire 180A to the heat generating member 120, a conductive heat-resistant material may be interposed between the first lead wire 180A and the heat generating member 120.

Conversely, the first lead wire 180A and the second lead wire 180B themselves are preferably members (for example, copper) having lower resistivities than the heat generating member 120. In this case, a rise in the temperatures of the first heater end portion 102A and the second heater end portion 102B can be alleviated.

The respective dimensions with respect to the heat generating member 120 change according to the specification of the first heater 100. As merely an example, if the heat generating member 120 is coiled, the outer diameter $D_4$ of the coil may be in a range of 10 mm to 100 mm.

(Tubular Member 130)

The tubular member 130 is constituted by metal as described above. The tubular member 130 may be constituted by a material containing at least one selected from, for example, platinum, tungsten, iridium, and molybdenum. Specifically, the tubular member 130 may be constituted by platinum, tungsten, iridium, molybdenum, or alloys thereof. When a platinum alloy is used as the tubular member 130, the alloy may include platinum and at least one of ruthenium, iridium, gold, and rhodium.

The tubular member 130 may not be necessarily constituted by a single material, and may be constituted by a combination of two or more types of materials. For example, in the tubular member 130, a part where the temperature rises (for example, the second part 105) may be made of the heat-resistant metal as described above, and a part where the temperature does not rise (for example, all or parts of the first part 104 and the third part 106) may be made of stainless steel or nickel-base alloys. The tubular member 130 having such a structure can be formed by joining two kinds of materials by, for example, welding or brazing.

It should be noted that an oxidation resistant coating layer 134 may be provided on all or a part of the first part 104 and/or the third part 106 of the tubular member 130. Such a configuration is particularly preferred when the tubular member 130 is constituted by a metal such as molybdenum or iridium.

Generally, molybdenum exhibits a significant decrease in the oxidation resistance in a temperature range of about 500 degrees Celsius or more, and iridium also exhibits a significant decrease in the oxidation resistance in a temperature range of about 900 degrees Celsius or more. Therefore, depending on the environment in which the first heater 100 is used, atmospheric oxidation may occur in portions of the first part 104 and/or the third part 106 of the tubular member 130 exposed to the atmosphere.

However, when the coating layer 134 is provided, such atmospheric oxidation can be reduced.

It should be noted that a portion corresponding to the tubular member 130 corresponding to the second part 105 is in contact with the heating target, which is not the atmospheric air, while the first heater 100 is used. Therefore, in such a portion, the risk of atmospheric oxidation is low. For this reason, it is not necessary to provide the coating layer 134 in such a portion.

The coating layer 134 may be; for example, a heat-resistant alloy such as MCrAlY (M is at least one metal selected from Ni, Co, and Fe); a silicide such as $MoSi_2$; platinum; glass; ceramics; or the like.

The two tips of the tubular member 130 preferably have respective flange portions 139A and 139B as illustrated in FIG. 1, such as shapes for making flange connections with the first lid member 170A and the second lid member 170B. The flange connections of the flange portions 139A and 139B to the first lid member 170A and the second lid member 170B, respectively, allow the internal space 110 to be properly sealed.

An O-ring such as a heat-resistant rubber and a metallic gasket may be provided between the flange portion 139A (and 139B) and the lid member 170A (and 170B).

A thickness $((W-D_1)/2)$ of the tubular member 130 may be, for example, in a range of 0.3 mm to 10 mm.

For example, a maximum value (maximum distance) of a gap $((D_1-D_4)/2)$ between the tubular member 130 and the heat generating member is in a range of 0.5 mm to 15 mm, preferably in a range of 1 mm to 9 mm, and still more preferably in a range of 1 mm to 6 mm.

(Intermediate Member 140)

As described above, the intermediate member 140 is constituted by an electrically insulating ceramic. The intermediate member 140 is constituted by a material that effectively transmits at least light having a wavelength of from 1 μm to 2 μm.

The transmittance of the intermediate member 140 with respect to light in a range of wavelength of from 1 μm to 2 μm is, for example, 50% or more, preferably 60% or more, more preferably 65% or more, and still more preferably 70% or more.

Examples of materials satisfying such characteristics include sapphire (monocrystalline aluminum oxide), transparent polycrystalline aluminum oxides, aluminum oxynitrides, yttrium oxides, spinel, zirconium oxides, yttrium aluminum garnet, magnesium oxides, quartz, and the like.

In particular, sapphire, aluminum oxynitrides, and transparent polycrystalline aluminum oxides are preferable.

For example, the intermediate member 140 may be constituted by a tube-shaped member of which both ends are open.

The intermediate member 140 is provided to extend over the second part 105. However, the tip of the intermediate member 140 may extend into the first part 104 and/or the third part 106.

The intermediate member 140 may be constituted by a single member extending throughout the longitudinal direction, or may be constituted by a combination of multiple members.

The thickness of the intermediate member 140, i.e., the dimension of $(D_2-D_3)/2$ in FIG. 2, may be, for example, in a range of 0.5 mm to 5 mm, and preferably in a range of 1 mm to 3 mm.

A gap $(D_1-D_4)/2$ between the tubular member 130 and the heat generating member 120 may be three times or less, preferably twice or less, of the thickness $(D_2-D_3)/2$ of the intermediate member 140.

In a case where a thickness deviation of the intermediate member 140 is large, a difference $(D_1-D_4)$ between the inner diameter of the tubular member 130 and the outer diameter of the heat generating member 120 may be three times or less, preferably twice or less, of a difference $(D_2-D_3)$ between the outer diameter and the inner diameter of the intermediate member 140.

The maximum distance between the intermediate member 140 and the tubular member 130 is preferably twice or less the thickness of the intermediate member, and more preferably equal to or less than the thickness of the intermediate member. The maximum distance between the heat generating member 120 and the intermediate member 140 is preferably less than twice the thickness of the intermediate member 140, and more preferably equal to or less than the thickness of the intermediate member 140.

The volume resistivity of the intermediate member is preferably $10^{10}$ Ωm or more, and more preferably $10^{11}$ Ωm or more, at a room temperature.

(First Insulating Member 175A and Second Insulating Member 175B)

The first insulating member 175A is constituted by an insulating material. In addition, the first insulating member 175A is required to have a seal function for appropriately sealing the gap between the opening 172A of the first lid member 170A and the first lead wire 180A.

The insulating member having such as seal function is well known to a person skilled in the art.

The same can be said with respect to the second insulating member 175B.

It should be noted that the configuration of the first insulating member 175A and the second insulating member 175B as illustrated in FIG. 1 is merely an example. It is clear to a person skilled in the art that these configurations are not particularly limited as long as the first lead wire 180A and the second lead wire 180B can be properly routed to the outside.

(Another Heater According to the Embodiment of the Present Invention)

Hereinafter, an example of configuration of another heater according to the embodiment of the present invention is explained with reference to FIG. 4.

Figure 4:
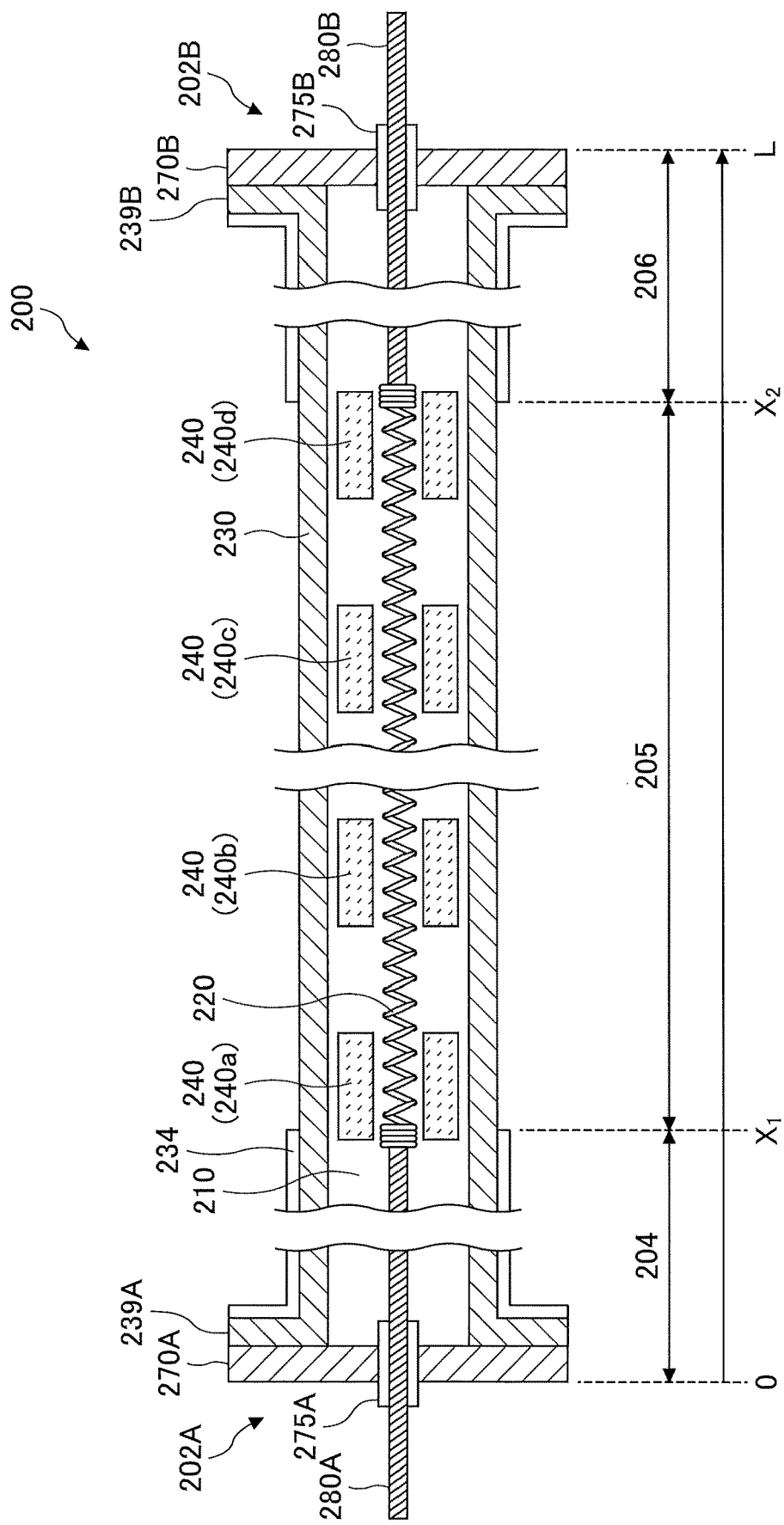
FIG. 4 is a drawing schematically illustrating an example of a cross section taken along a central axis of another heater according to the embodiment of the present invention.

FIG. 4 schematically illustrates an example of a structure of another heater (hereinafter referred to as a "second heater") according to the embodiment of the present invention.

As illustrated in FIG. 4, the second heater 200 has a configuration similar to the first heater 100 explained above. Therefore, in FIG. 4, reference symbols obtained by adding 100 to the reference symbols used in FIG. 1 are given to the members similar to those of the first heater 100.

However, in the second heater 200, the configuration of an intermediate member 240 is different from the intermediate member 140 of the first heater 100.

Specifically, in the second heater 200, the intermediate member 240 is constituted by multiple rings 240a to 240d.

The rings 240a to 240d are arranged in the internal space 210 of the second heater 200 to surround the heat generating member 220.

The interval at which the rings 240a to 240d are arranged is not particularly limited. However, the rings are arranged at such intervals that the heat generating member 220 and the tubular member 230 do not come into contact with each other even when the heat generating member 220 is heated to a high temperature to be deformed while the second heater 200 is used.

The rings 240a to 240d may be arranged at equal (regular) intervals or at unequal (random) intervals along the central axis direction of the second heater 200.

Also, the widths (i.e., the dimension in the central axis direction of the second heater 200) and the thicknesses (i.e., the dimension in a direction perpendicular to the central axis of the second heater 200) of the rings 240a to 240d may be the same as each other or different from each other.

Unlike the intermediate member 140 of the first heater 100, the rings 240a to 240d of the second heater 200 do not necessarily have to be constituted by a material that transmits light having a predetermined wavelength. This is because the heat rays generated from the heat generating member 220 can reach the tubular member 230 through the "gaps" between adjacent rings (for example, between the ring 240a and the ring 240b), i.e., through the area where the rings 240a to 240d do not exist. It is to be understood that the rings 240a to 240d may be constituted by a material similar to the intermediate member 140 of the first heater 100 explained above.

Even in a case where the intermediate member 240 is configured in this way, the effects described above can be obtained. That is, even if the heat generating member 220 is heated to a high temperature, a contact between the heat generating member 220 and the tubular member 230 can be significantly prevented due to the presence of the intermediate member 240.

In addition, the second heater 200 can effectively irradiate the tubular member 230 with the heat rays generated from the heat generating member 220 by the radiation method. As a result, the heat collection efficiency of the tubular member 230 is increased, and the tubular member 230 can be heated to a relatively higher temperature.

In addition, with the second heater 200, it is not necessary to use a large-scale device to energize the heat generating member 220, and the size of a system for heating the heating target can be reduced.

(Components of Second Heater 200)

For the specifications of most of the components included in the second heater 200, the above description can be referred to. Therefore, hereinafter, the features of the intermediate member 240 of the second heater 200 are explained in detail.

(Intermediate Member 240)

The rings 240a to 240d that constitute the intermediate member 240 are constituted by an insulating material such as a ceramic.

For example, the intermediate member 240 may be constituted by aluminum oxides, magnesium oxides, zirconium oxides, yttrium oxides, cerium oxides, beryllium oxides, zirconium silicates (zircons), silicon dioxides, mullites, boron nitrides, aluminum nitrides, and the like. Also, the materials applicable to the intermediate member 140 of the first heater 100 described above can also be used.

Herein, the configuration and the arrangement of the rings 240a to 240d are not particularly limited, as long as 50% or more of heat rays radiated from the heat generating member 220 (light having a wavelength of from 1 μm to 2 μm) can reach the tubular member 230.

For example, in a case where the rings 240a to 240d are constituted by a material that does not transmit heat rays (i.e., the transmittance of the heat rays is zero), the rings 240a to 240d are arranged around the heat generating member 220 so that a coverage rate for the heat generating member 220 becomes less than 50%. The coverage rate is preferably less than 40%, more preferably less than 35%, and still more preferably less than 30%.

The number of rings 240a to 240d to be provided is not particularly limited. With respect to the dimensions of the rings 240a to 240d, the explanation about the intermediate member 140 of the first heater 100 can be referred to.

(Still Another Heater According to the Embodiment of the Present Invention)

Hereinafter, an example of configuration of still another heater according to the embodiment of the present invention is explained with reference to FIG. 5.

Figure 5:
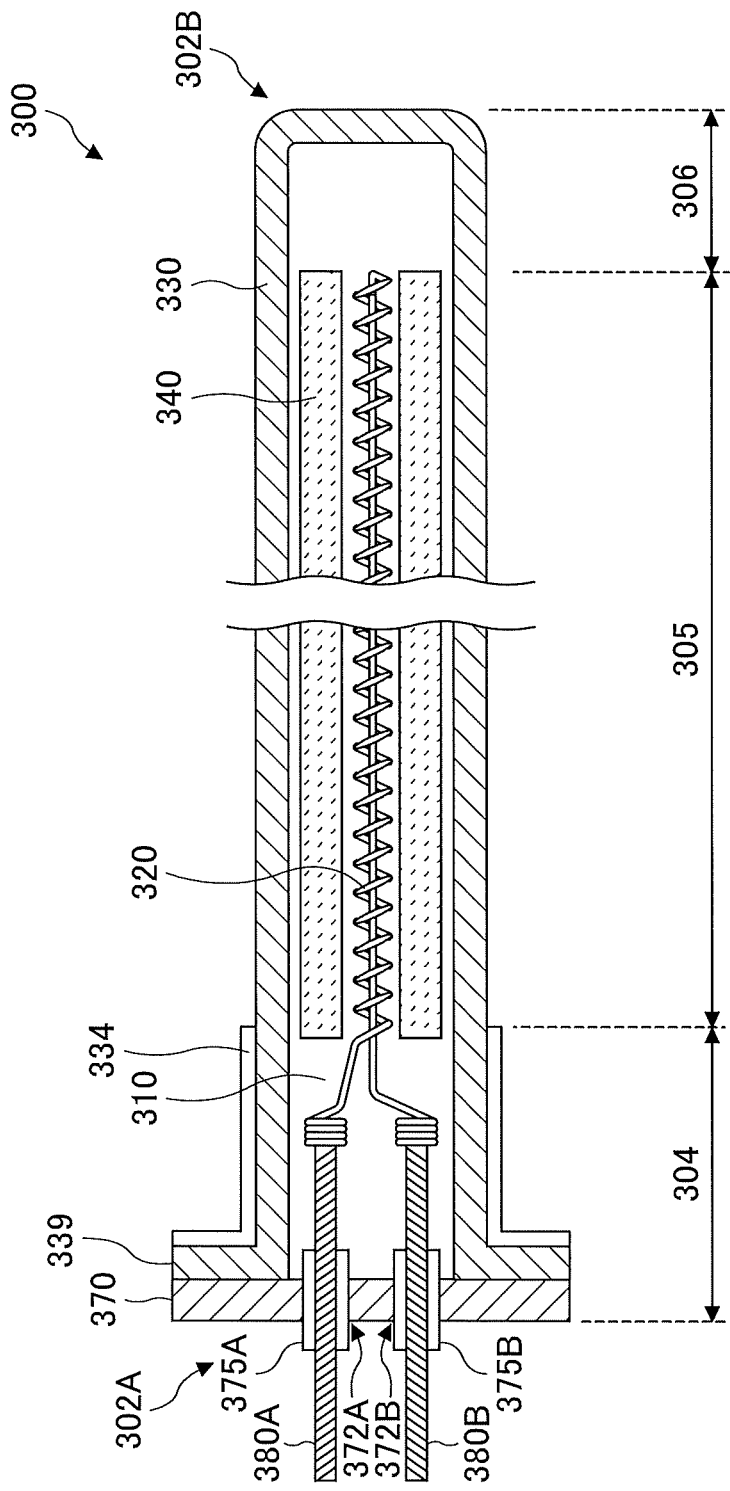
FIG. 5 is a drawing schematically illustrating an example of a cross section taken along a central axis of still another heater according to the embodiment of the present invention.

FIG. 5 schematically illustrates an example of a structure of still another heater (hereinafter referred to as a "third heater") according to the embodiment of the present invention.

As illustrated in FIG. 5, the third heater 300 has a configuration similar to the first heater 100 explained above. Therefore, in FIG. 5, reference symbols obtained by adding 200 to the reference symbols used in FIG. 1 are given to the members similar to those of the first heater 100.

However, the third heater 300 mainly has a difference in that the structure of a second heater end portion 302B is different from the structure of the second heater end portion 102B of the first heater 100.

That is, in the third heater 300, a metal tube of which one end is closed is used as the tubular member 330. As a result, in the third heater 300, the members provided in the second heater end portion 102B of the first heater 100 (i.e., the second lid member 170B, the second insulating member 175B, and the like) are omitted.

However, in the third heater 300, the second lead wire 380B needs to be routed to the outside through the side of the first heater end portion 302A.

Therefore, the heat generating member 320 is configured so that both end portions are guided to the same side. That is, one end portion of the heat generating member 320 passes through the inside of the coil to be guided to the same side as the other end portion. In this case, the core member having the tubular shape as described above may be used in the heat generating member 320. With the core member, one end portion of the heat generating member 320 can be easily passed through the coil.

Also, a lid member 370 is used as the first heater end portion 302A of the third heater 300.

This lid member 370 is provided with a first opening 372A through which the first lead wire 380A is routed to the outside and a second opening 372B through which the second lead wire 380B is routed to the outside. The first insulating member 375A is inserted into the first opening 372A of the lid member 370, and the first lead wire 380A penetrates through the first insulating member 375A to be routed to the outside. The second insulating member 375B is inserted into the second opening 372B, and the second lead wire 380B penetrates through the second insulating member 375B to be routed to the outside.

In addition, in the example illustrated in FIG. 5, the intermediate member 340 has a tubular shape structure of which both ends are open, like the intermediate member 140 of the first heater 100. Alternatively, in the third heater 300, the intermediate member 340 may be constituted by a tube of which one end (an end on the same side as the second heater end portion 302B) is sealed.

It is clear that the above-mentioned effects can also be obtained with the third heater 300. That is, the third heater 300 can also effectively irradiate the tubular member 330 with the heat rays generated from the heat generating member 320 by the radiation method. As a result, the heat collection efficiency of the tubular member 330 is increased, and the tubular member 330 can be heated to a relatively higher temperature.

In addition, it is not necessary to use a large-scale device to energize the heat generating member 320, and the size of a system for heating the heating target can be reduced.

In such a heater as illustrated in FIG. 5 in which the lead wires are gathered at one end, the second heater end portion can be brought into contact with the heating target. Therefore, such a heater can also be used as, for example, a type of heat source that is simply immersed in a melting furnace that melts materials. Such a heater can also be used as a type of heat source that is inserted, in a penetrating manner, from one furnace wall of the melting furnace to the other furnace wall opposite the one wall. Heaters such as the first heater 100 and the second heater 200 in which the lead wires protrude from the respective heater end portions can be used as a type of heat source that is inserted, in a penetrating manner, from one furnace wall of the melting furnace to the other furnace wall opposite the one wall.

Hereinabove, the configuration and features of the heater according to the embodiment of the present invention have been described with reference to the first heater 100 to the third heater 300. However, it should be noted that this is merely an example, and a person skilled in the art can conceive of various configurations of heaters by referring to the above explanation.

For example, in the third heater 300 illustrated in FIG. 5, multiple ring-shaped members as illustrated in FIG. 4 may be used as the intermediate member 340 instead of the tubular member. In addition, various forms can be conceived of as heaters according to the embodiment of the present invention.

(Manufacturing Apparatus for Manufacturing Glass Product According to the Embodiment of the Present Invention)

Hereinafter, a configuration of a manufacturing apparatus for manufacturing a glass product according to the embodiment of the present invention is explained with reference to FIG. 6.

Figure 6:
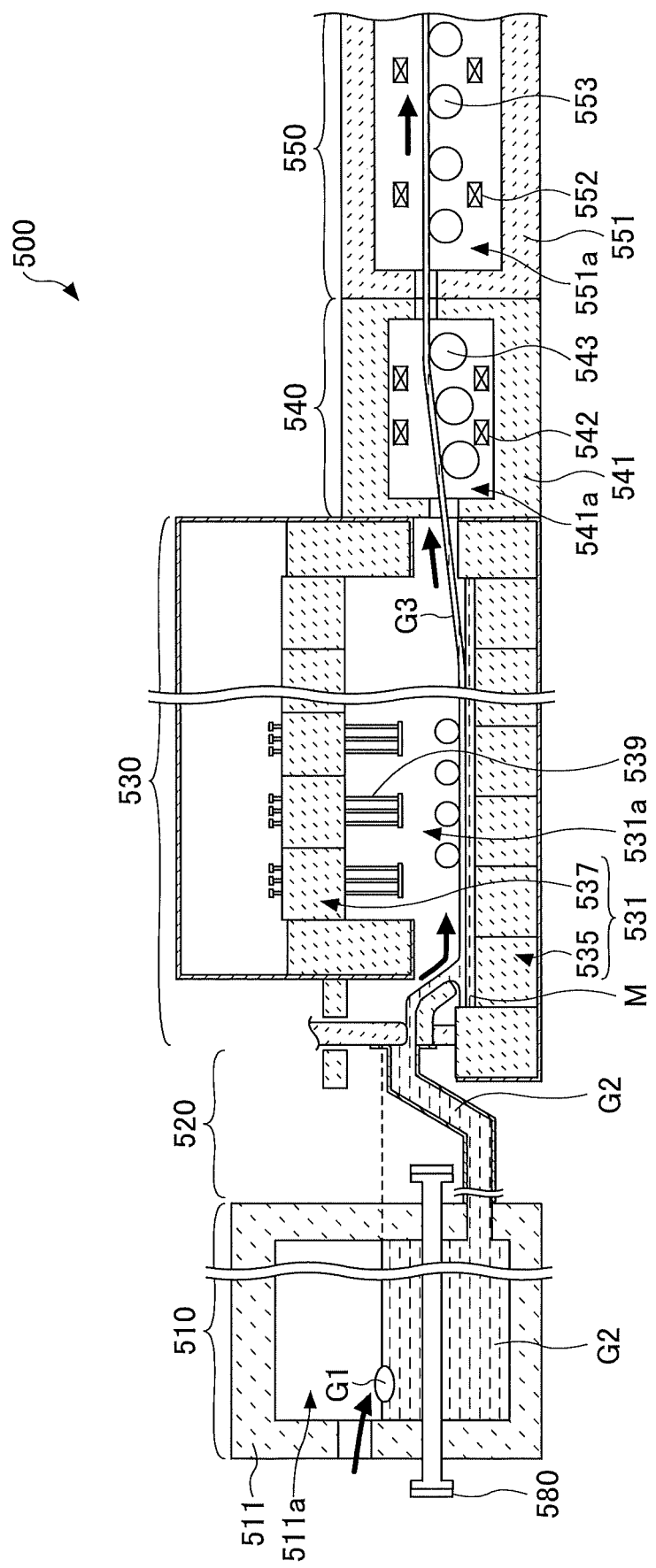
FIG. 6 is a cross sectional view schematically illustrating an example of configuration of a manufacturing apparatus for manufacturing a glass product according to an embodiment of the present invention.

FIG. 6 schematically illustrates an example of configuration of a manufacturing apparatus for manufacturing a glass product (hereinafter referred to as a "first manufacturing apparatus") 500 according to the embodiment of the present invention.

As illustrated in FIG. 6, the first manufacturing apparatus 500 includes a melting unit 510, a conveying unit 520, a forming unit 530, a connection unit 540, and an annealing unit 550.

The melting unit 510 is a zone for melting a glass material G1 to form molten glass G2.

The melting unit 510 includes a melting furnace 511 for partitioning a melting chamber 511a. Although not illustrated in the figure, one or more burners may be provided in an upper portion of the melting chamber 511a.

The conveying unit 520 is a zone for conveying the molten glass G2 formed by the melting unit 510 to the forming unit 530.

The forming unit 530 is a zone for forming the molten glass G2 carried from the conveying unit 520 into a belt-shaped glass ribbon G3.

The forming unit 530 includes a forming furnace 531. The forming furnace 531 includes a forming chamber 531a for forming the molten glass G2. The forming furnace 531 includes a float bath 535 and a ceiling 537 provided in an upper portion of the float bath 535. The ceiling 537 is provided with multiple ceiling heaters 539.

The float bath 535 contains molten metal M. The molten metal M is, for example, molten tin and the like. However, in addition to molten tin, a molten tin alloy and the like can also be used.

In order to suppress the oxidation of the molten metal M, the forming chamber 531a is filled with reducing gas. For example, the reducing gas is constituted by a mixed gas of hydrogen gas and nitrogen gas.

In the float bath 535, the molten glass G2 provided onto the molten metal M is formed into the belt-shaped glass ribbon G3 by using the liquid surface of the molten metal M.

The glass ribbon G3 gradually solidifies as the glass ribbon G3 flows from the upstream to the downstream of the float bath 535, and is pulled up from the molten metal M at the downstream of the float bath 535.

The ceiling heaters 539 are provided at intervals along the flow direction of the glass ribbon G3 to adjust the temperature distribution in the flow direction of the glass ribbon G3. The ceiling heaters 539 are provided at intervals in the width direction of the glass ribbon G3 to adjust the temperature distribution in the width direction of the glass ribbon G3.

The connection unit 540 is a zone for connecting the forming unit 530 and the annealing unit 550. The connection unit 540 includes a connection furnace 541, intermediate heaters 542, and a lift out roll 543.

The connection furnace 541 includes a connection chamber 541a for conveying the glass ribbon G3. The multiple intermediate heaters 542 are provided in the connection chamber 541a.

The intermediate heaters 542 are provided at intervals along the flow direction of the glass ribbon G3 to adjust the temperature distribution in the conveying direction of the glass ribbon G3. The intermediate heaters 542 may be divided in the width direction of the glass ribbon G3 to adjust the temperature distribution in the width direction of the glass ribbon G3.

The lift out roll 543 is rotationally driven by a motor or the like to lift the glass ribbon G3 formed by the forming unit 530 and convey the glass ribbon G3 to the annealing unit 550.

The annealing unit 550 is a zone for annealing the glass ribbon G3 conveyed from the connection unit 540.

The annealing unit 550 includes an annealing furnace 551. The annealing furnace 551 forms an annealing chamber 551a for annealing the glass ribbon G3. The annealing chamber 551a is provided with multiple annealing heaters 552 and multiple annealing rolls 553. The annealing chamber 551a is configured so that the temperature gradually decreases from the inlet of the annealing furnace 551 to the outlet of the annealing furnace 551.

The annealing heaters 552 are provided at intervals along the conveying direction of the glass ribbon G3 to adjust the temperature distribution in the conveying direction of the glass ribbon G3. The annealing heaters 552 may be divided in the width direction of the glass ribbon G3 to adjust the temperature distribution in the width direction of the glass ribbon G3.

The annealing rolls 553 are rotationally driven by a motor or the like to convey the glass ribbon G3 from the entrance of the annealing furnace 551 to the exit of the annealing furnace 551. The annealing rolls 553 are provided at intervals along the conveying direction of the glass ribbon G3.

Herein, in the first manufacturing apparatus 500, the melting unit 510 is provided with the heater according to the embodiment of the present invention.

For example, in the example as illustrated in FIG. 6, a heater 580 according to the embodiment of the present invention is provided in the melting furnace 511. In FIG. 6, the heater 580 is illustrated in a simplified manner, and lead wires and the like are not illustrated.

The heater 580 is arranged horizontally so as to penetrate through the melting furnace 511. For example, the heater 580 may be the first or second heater 100, 200 as illustrated in FIG. 1 or FIG. 4.

Alternatively, the heater 580 may be the third heater 300 as illustrated in FIG. 5. In this case, the heater 580 may be installed vertically by being inserted from the floor below the melting furnace or from above the melting furnace or may be installed horizontally by being inserted from one of the furnace walls.

Although not clear in FIG. 6, normally, multiple heaters 580 are installed. For example, the multiple heaters 580 may be installed at intervals at the same height level in the melting furnace 511. In addition to this, or separately from this, the multiple heaters 580 may be installed at different height levels in the melting furnace 511. Hereinafter, the operation of the first manufacturing apparatus 500 having the above configuration is explained.

First, the glass material G1 is supplied to the melting unit 510. The glass material G1 is supplied to the melting chamber 511a of the melting furnace 511.

The glass material G1 is melted by heat applied from the heater 580, and the molten glass G2 is formed.

Herein, the heater according to the embodiment of the present invention is used as the heater 580. Therefore, in the melting unit 510, it is not necessary to use a large-scale device, and the size of the melting unit can be reduced. In addition, the heater 580 can melt, for example, the glass material G1 and heat the molten glass G2 to a high temperature higher than 1500 degrees Celsius.

Hereinafter, the molten glass G2 of the melting unit 510 is supplied to the forming unit 530 via the conveying unit 520.

The molten glass G2 supplied to the forming unit 530 continuously moves on the molten metal M. As a result, the belt-shaped glass ribbon G3 is formed from the molten glass G2. The glass ribbon G3 gradually solidifies as the glass ribbon G3 flows from upstream to the downstream of the float bath 535.

Hereinafter, the glass ribbon G3 is provided via the connection unit 540 to the annealing unit 550.

The annealing unit 550 is configured so that the temperature gradually decreases from the upstream to the downstream of the annealing chamber 551a. Accordingly, the temperature of the glass ribbon G3 gradually decreases as the glass ribbon G3 is conveyed in the annealing chamber 551a.

Thereafter, when the temperature of the glass ribbon G3 drops to a predetermined temperature, the glass ribbon G3 is cut into a predetermined size by a cutting machine.

As a result, a glass product is manufactured.

Hereinabove, the structure and operation of a manufacturing apparatus for manufacturing a glass product according to the embodiment of the present invention have been described with reference to the first manufacturing apparatus 500 as an example.

However, these are merely examples, and the manufacturing apparatus for manufacturing a glass product according to the embodiment of the present invention may have other configurations as long as the manufacturing apparatus includes the heater according to the embodiment of the present invention.

For example, in the first manufacturing apparatus 500, the heater according to the embodiment of the present invention is installed in the melting unit 510.

However, in addition to this, or separately from this, the heater according to the embodiment of the present invention may be provided in the conveying unit 520.

Also, in the first manufacturing apparatus 500, a zone including an additional member, such as a refining furnace for removing bubbles contained in the molten glass G2 and/or a stirring furnace for homogenizing the molten glass G2, may be provided between the melting unit 510 and the conveying unit 520. The heater according to the embodiment of the present invention may be provided in such a refining furnace and/or such a stirring furnace.

Further, in the first manufacturing apparatus 500, at least one of the conveying unit 520 and the connection unit 540 may be omitted. In this case, the molten glass G2 formed by the melting unit 510 may be directly discharged to the forming unit 530, and/or the glass ribbon G3 formed by the forming unit 530 may be directly conveyed to the annealing unit 550.

A person skilled in the art can conceive of various kinds of changes other than those explained above.

(Manufacturing Method for Manufacturing Glass Product According to the Embodiment of the Present Invention)

Hereinafter, a method for manufacturing a glass product according to the embodiment of the present invention will be explained with reference to FIG. 7.

Figure 7:
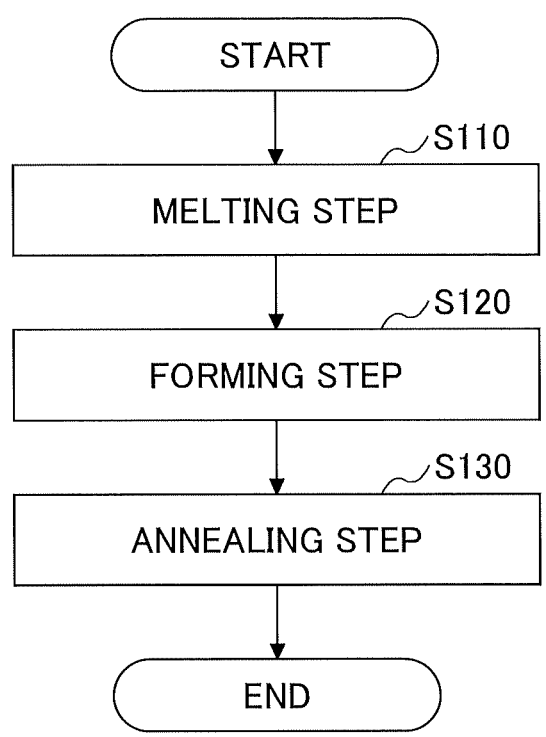
FIG. 7 is a flow diagram schematically illustrating an example of a manufacturing method for manufacturing a glass product according to an embodiment of the present invention.

As illustrated in FIG. 7, the method for manufacturing a glass product according to the embodiment of the present invention (hereinafter referred to as a "first manufacturing method") includes:
- a melting step (step S110) for melting a glass material to form a molten glass;
- a forming step (step S120) for forming the molten glass; and
- an annealing step (step S130) for annealing the formed glass.

However, the annealing step is not always a necessary step in the first manufacturing method and may be omitted.

Hereinafter, each step will be explained.

(Step S110)

First, a glass material is supplied to the melting furnace, in which the glass material is melted.

The melting furnace may have a configuration similar to the melting furnace 511 of the first manufacturing apparatus 500 explained above.

The heater according to the embodiment of the present invention may be installed in the melting furnace. In this case, the glass material is heated by the heater according to the embodiment of the present invention and becomes molten glass.

The glass material is not particularly limited. However, it should be noted that, in a case where the heater according to the embodiment of the present invention is installed in the melting furnace, the molten glass obtained by melting the glass material can be heated to a high temperature of more than, for example, 1500 degrees Celsius. Specifically, in the first manufacturing method, a glass material having a high melting point can be used.

The molten glass melted in the melting furnace is conveyed to the forming furnace.

During the conveyance, the molten glass may be discharged from the melting furnace into the conveying unit, and the molten glass may be supplied to the forming furnace from the conveying unit. For example, another apparatus (hereinafter referred to as "additional apparatus") such as a refining furnace may be provided between the melting furnace and the conveying unit. Alternatively, the molten glass may be directly provided from the melting furnace to the forming furnace.

In a case where the molten glass is conveyed to the conveying unit before being supplied to the forming furnace, the conveying unit may be provided with the heater according to the embodiment of the present invention. In a case where the molten glass is supplied to the additional apparatus before being supplied to the forming furnace, the additional apparatus may be provided with the heater according to the embodiment of the present invention.

In other words, the heater according to the embodiment of the present invention may be provided at any position between the melting furnace and the conveying unit.

(Step S120)

Hereinafter, the molten glass conveyed to the forming furnace is formed.

The forming process is not particularly limited. For example, the molten glass may be formed by a conventional forming process such as a float process, a downdraw process, a roll out process, or a fusion process.

Among them, in a case where the molten glass is formed by the float process, the forming unit 530 of the first manufacturing apparatus 500 as illustrated in FIG. 6 may be used. For example, a glass ribbon may be formed by providing the molten glass onto the float bath of the forming furnace and conveying the molten glass from the upstream to the downstream.

(Step S130)

Thereafter, if necessary, the molded glass is cooled to a room temperature. Also, if necessary, the formed glass is cut into a predetermined shape.

The formed glass product can be manufactured according to the steps described above.

In the first manufacturing method, the heater according to the embodiment of the present invention may be used in any given step between the melting step (step S110) and the forming step (step S120) (however, the any given step does not include the forming step itself).

In the first manufacturing method, the heater according to the embodiment of the present invention is used to heat the molten glass. Therefore, in the first manufacturing method, even if the temperature of the molten glass exceeds a temperature of, for example, 1500 degrees Celsius, the molten glass can be heated stably.

Examples

Hereinafter, examples of the present invention will be explained.

A heater having a configuration similar to the third heater was made. In addition, a heating test of a glass melting furnace was carried out with this heater.

(Manufacturing of Heater)

Platinum rhodium alloy was used as the tubular member of the heater. The outer diameter W of the tubular member was 30.4 mm, and the inner diameter $D_1$ was 28.2 mm. A sapphire tube was used as the intermediate member. The outer diameter $D_2$ of the sapphire tube was 27.4 mm, and the inner diameter $D_3$ was 24.4 mm. A coiled molybdenum wire with a diameter of 1.0 mm was used as the heat generating member. The outer diameter of the heat generating member (diameter $D_4$ of the coil) was 22.2 mm. The resistance value between both of the terminals at a room temperature was about 1.2Ω.

The lid members on both ends of the heater were constituted by stainless steel. Copper wires were used for the lead wires on both sides. The lead wires were electrically connected to the respective end portions of the heat generating member via molybdenum wires having a diameter p of 1.6 mm.

The entire length L of the heater was 810 mm. The length of the first part of the heater was 280 mm, and the length of the second part was 500 mm. The length of the third part 306 of the heater was 30 mm (see FIG. 5).

(Heating Test)

Multiple heaters as explained above were attached to a glass melting furnace, and a glass melting test was conducted.

The glass melting furnace was in a shape of a box with an upper side open and a width of 500 mm. In the side walls of the glass melting furnace, multiple through holes having a diameter of slightly larger than the outer diameter of the heater were formed.

The heaters were inserted into the respective through holes.

An outlet for discharging the molten glass was provided in one wall surface parallel to the inserted heater.

First, glass scrap was introduced into the glass melting furnace, so that the glass scrap piles up to a position slightly higher than each heater. Therefore, the part of the heater excluding the first heater end part of the heater, i.e., the part of the heater exposed in the melting chamber of the glass melting furnace, was completely covered with glass scraps.

In this state, an electric current was supplied to the first and second lead wires of the heaters to start heating of the multiple heaters. As a result, the glass scrap was melted.

Then, the glass material was started to be continuously introduced from the upper side of the glass melting furnace. The glass material became molten glass in the glass melting furnace and was continuously discharged from the outlet of the glass melting furnace. The discharged molten glass was made into a glass product in an approximately plate shape by a roll-out formation process. The rate of the introduction of the glass material and the discharge speed of the molten glass were approximately 40 kg/hour in terms of glass.

Table 1 illustrates a temporal change in the molten glass temperature at the outlet, the voltage, the current, and the power applied to the heater closest to the outlet, the resistance value, and an average temperature of the heat generating members calculated from the resistance value.

more, and the continuously supplied glass material was melted by heating the heater, and that the temperature of the molten glass was raised to 1500 degrees Celsius or more. At that time, the voltage and the current applied to each heater were about 135 V and about 14 A, respectively, which could be achieved by generally-available power supply equipment.

As described above, it was confirmed that the heating target can be stably heated without using large-scale power supply facilities by using the heater according to the embodiment of the present invention.

What is claimed is:

1. A heater, comprising:
    a heat generating member being conductive and configured to radiate heat rays by being fed with electric power;
    a tubular member constituted by a metal and accommodating the heat generating member; and
    an intermediate member arranged between the heat generating member and the tubular member and constituted by an electrically insulating material,
    wherein the intermediate member is arranged and/or configured to allow a portion of the heat rays radiated from the heat generating member to pass through the intermediate member to reach the tubular member, the portion of the heat rays including at least light having a wavelength of from 1 μm to 2 μm,
    wherein the tubular member has an inner diameter of D1, the intermediate member has an outer diameter of D2 and an inner diameter of D3, the heat generating member has an outer diameter of D4, and
    (D1−D4) is three times or less of (D2−D3), or (D2−D3)/2 is in a range of 0.5 mm to 5 mm.

2. The heater according to claim 1, wherein the intermediate member is constituted by a ceramic tube having a transmittance of 50% or more with respect to the light having the wavelength of from 1 μm to 2 μm.

TABLE 1

| | Heater closest to the outlet | | | | | |
|---|---|---|---|---|---|---|
| Time | Voltage V | Current A | Power kW | Resistance value Ω | Average temperature of heat generating members calculated from the resistance value °C. | Molten glass temperature at outlet °C. |
| 1/19 03:00 | 135.7 | 13.6 | 1.84 | 10.0 | 1671.4 | 1512.0 |
| 1/19 03:30 | 135.3 | 13.6 | 1.84 | 10.0 | 1666.7 | 1509.3 |
| 1/19 04:00 | 135.4 | 13.6 | 1.84 | 10.0 | 1667.9 | 1513.5 |
| 1/19 04:30 | 134.8 | 13.6 | 1.83 | 9.9 | 1659.6 | 1497.5 |
| 1/19 05:00 | 134.7 | 13.6 | 1.83 | 9.9 | 1658.4 | 1486.2 |
| 1/19 05:30 | 134.5 | 13.7 | 1 84 | 9.8 | 1643.6 | 1475.5 |
| 1/19 06:00 | 134.5 | 13.6 | 1.82 | 9.9 | 1656.1 | 1489.4 |
| 1/19 06:30 | 134.6 | 13.6 | 1.83 | 9.9 | 1657.2 | 1486.3 |
| 1/19 07:00 | 135.3 | 13.6 | 1.84 | 10.0 | 1666.7 | 1510.6 |
| 1/19 07:30 | 135.0 | 13.6 | 1.83 | 10.0 | 1663.2 | 1499.5 |
| 1/19 08:00 | 134.8 | 13.6 | 1.83 | 9.9 | 1659.6 | 1496.3 |
| 1/19 08:30 | 135.3 | 13.6 | 1.84 | 10.0 | 1666.7 | 1511.7 |
| 1/19 09:00 | 135.0 | 13.6 | 1.83 | 10.0 | 1663.2 | 1510.3 |
| 1/19 09:30 | 135.2 | 13.6 | 1.84 | 10.0 | 1665.5 | 1515.3 |
| 1/19 10:00 | 135.0 | 13.6 | 1.83 | 10.0 | 1663.2 | 1505.0 |
| 1/19 10:30 | 138.6 | 14.0 | 1.94 | 9.9 | 1656.6 | 1502.3 |
| 1/19 11:00 | 135.2 | 13.6 | 1.84 | 10.0 | 1665.5 | 1505.3 |
| 1/19 11:30 | 135.2 | 13.6 | 1.84 | 10.0 | 1665.5 | 1500.7 |
| 1/19 12:00 | 135.6 | 13.6 | 1.84 | 10.0 | 1670.3 | 1502.5 |

From Table 1, it was found that the heater used according to the Example functioned stably when the temperature of the heat generating member was 1650 degrees Celsius or 3. The heater according to claim 1, wherein the intermediate member includes a single continuous ring-shaped ceramic.

4. The heater according to claim 3, wherein the intermediate member is of such a material and a shape that 50% or more of the light having the wavelength of from 1 µm to 2 µm radiated from the heat generating member reaches the tubular member.

5. The heater according to claim 2, wherein the intermediate member is constituted by sapphire.

6. The heater according to claim 1, wherein the intermediate member has a volume resistivity of $10^{10}$ Ωm or more at a room temperature.

7. The heater according to claim 1, wherein in a cross section of the heater, a maximum distance between the heat generating member and the tubular member is three times or less of a thickness of the intermediate member.

8. The heater according to claim 1, wherein in a cross section of the heater, a maximum distance between the intermediate member and the tubular member is less than twice a thickness of the intermediate member.

9. The heater according to claim 1, wherein in a cross section of the heater, a maximum distance between the heat generating member and the intermediate member is less than twice a thickness of the intermediate member.

10. The heater according to claim 1, wherein the heat generating member is coiled.

11. The heater according to claim 1, wherein the heat generating member is constituted by a material containing one or more selected from molybdenum, tungsten, tantalum, niobium, iridium, platinum, and rhodium.

12. The heater according to claim 1, wherein the tubular member is constituted by a material containing one or more selected from platinum, tungsten, iridium, and molybdenum.

13. The heater according to claim 1, wherein the heater has an approximate rod shape having two heater end portions, and
wherein lead wires electrically connected to respective end portions of the heat generating member extend from the respective heater end portions.

14. The heater according to claim 1, wherein the heater has an approximate rod shape having two heater end portions, and
wherein lead wires electrically connected to respective end portions of the heat generating member extend from one of the heater end portions.

15. A manufacturing apparatus for manufacturing a glass product, comprising:
a melting unit configured to melt a glass material to form molten glass; and
a forming unit configured to make formed glass from the molten glass,
wherein a heater is provided in any given unit disposed between the melting unit and the forming unit, the any given unit not including the forming unit,
wherein the heater includes:
a heat generating member being conductive and configured to radiate heat rays by being fed with electric power;
a tubular member constituted by a metal and accommodating the heat generating member; and
an intermediate member provided between the heat generating member and the tubular member and constituted by an electrically insulating material,
wherein the intermediate member is arranged and/or configured to allow a portion of the heat rays radiated from the heat generating member to pass through the intermediate member to reach the tubular member, the portion of the heat rays including at least light having a wavelength of from 1 µm to 2 µm,
wherein the tubular member has an inner diameter of D1, the intermediate member has an outer diameter of D2 and an inner diameter of D3, the heat generating member has an outer diameter of D4, and
(D1−D4) is three times or less of (D2−D3), or (D2−D3)/2 is in a range of 0.5 mm to 5 mm.

16. The manufacturing apparatus according to claim 15, further comprising a conveying unit configured to connect the melting unit and the forming unit.

17. The manufacturing apparatus according to claim 15, wherein the heater is provided in the melting unit.

18. A manufacturing method for manufacturing a glass product, comprising:
a melting step for melting a glass material to form a molten glass; and
a forming step for forming the molten glass to make a glass product,
wherein the molten glass comes into contact with a heater in any given step between the melting step and the forming step, the any given step not including the forming step,
wherein the heater includes:
a heat generating member being conductive and configured to radiate heat rays by being fed with electric power;
a tubular member constituted by a metal and accommodating the heat generating member; and
an intermediate member provided between the heat generating member and the tubular member and constituted by an electrically insulating material, and
wherein the intermediate member is arranged and/or configured to allow a portion of the heat rays radiated from the heat generating member to pass through the intermediate member to reach the tubular member, the portion of the heat rays including at least light having a wavelength of from 1 µm to 2 µm,
wherein the tubular member has an inner diameter of D1, the intermediate member has an outer diameter of D2 and an inner diameter of D3, the heat generating member has an outer diameter of D4, and
(D1−D4) is three times or less of (D2−D3), or (D2−D3)/2 is in a range of 0.5 mm to 5 mm.

19. The heater according to claim 1, wherein the intermediate member includes a plurality of ring-shaped ceramics spaced apart from each other and each surrounding the heat generating member.

20. The heater according to claim 1, wherein:
(D2−D3)/2 is in the range of 0.5 mm to 5 mm.

21. The heater according to claim 1, wherein:
(D1−D4) is three times or less of (D2−D3).

22. The heater according to claim 1, wherein:
a maximum distance between the intermediate member and the tubular member is (D2−D3) or less, and
a maximum distance between the heat generating member and the intermediate member is less than (D2−D3).

23. The heater according to claim 15, wherein:
(D2−D3)/2 is in the range of 0.5 mm to 5 mm.

24. The heater according to claim 15, wherein:
(D1−D4) is three times or less of (D2−D3).

25. The heater according to claim 15, wherein:
a maximum distance between the intermediate member and the tubular member is (D2−D3) or less, and
a maximum distance between the heat generating member and the intermediate member is less than (D2−D3).

26. The heater according to claim 18, wherein:
(D2−D3)/2 is in the range of 0.5 mm to 5 mm.

27. The heater according to claim 18, wherein:
(D1−D4) is three times or less of (D2−D3).

28. The heater according to claim 18, wherein:
a maximum distance between the intermediate member and the tubular member is (D2−D3) or less, and
a maximum distance between the heat generating member and the intermediate member is less than (D2−D3).

* * * * *